(12) United States Patent
Moriyama

(10) Patent No.: US 9,783,032 B2
(45) Date of Patent: Oct. 10, 2017

(54) DEFLECTOR DEVICE

(71) Applicant: MAZDA MOTOR CORPORATION, Hiroshima (JP)

(72) Inventor: Yukihiro Moriyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 15/180,233

(22) Filed: Jun. 13, 2016

(65) Prior Publication Data

US 2016/0368354 A1   Dec. 22, 2016

(30) Foreign Application Priority Data

Jun. 22, 2015   (JP) .................................. 2015-124534

(51) Int. Cl.
*B60J 7/22*   (2006.01)

(52) U.S. Cl.
CPC .................................... *B60J 7/223* (2013.01)

(58) Field of Classification Search
CPC ... B60J 7/223; B60J 5/101; B60J 11/02; B60J 1/2088; B60J 5/0415; B60J 7/026; B60J 7/041
USPC .......... 296/180.1, 180.4, 76, 100.03, 136.04; 180/229
See application file for complete search history.

(56) References Cited

U.S. PATENT DOCUMENTS

| | | | | |
|---|---|---|---|---|
| 4,268,085 A | * | 5/1981 | Sakai ......................... | B60J 7/22 296/217 |
| 4,838,604 A | * | 6/1989 | Kochi .................... | B62D 35/00 296/180.5 |
| 4,929,013 A | * | 5/1990 | Eke ............................ | B60J 1/20 296/180.5 |
| 6,666,503 B1 | * | 12/2003 | Sorensen ................... | B60J 7/22 296/217 |
| 7,399,024 B2 | * | 7/2008 | Ordonio, Jr. ......... | B62D 35/007 296/180.1 |
| 2002/0175539 A1 | * | 11/2002 | Biecker ................. | B60J 7/0053 296/217 |
| 2015/0284039 A1 | * | 10/2015 | Guinois ................ | B62D 35/02 296/180.5 |

FOREIGN PATENT DOCUMENTS

JP          59-124432 A       7/1984

* cited by examiner

*Primary Examiner* — Glenn Dayoan
*Assistant Examiner* — Sunsurraye Westbrook
(74) *Attorney, Agent, or Firm* — Studebaker & Brackett PC

(57) ABSTRACT

Front and rear support members which support a deflector plate configured to project upward above a front header when a roof is open include respective joint portions where respective lower portions thereof are joined to each other. The deflector plate includes deflector lower portions which project downward at respective positions where the deflector lower portions do not interfere with the joint portions of the front and rear support members when the deflector plate is located at a lowermost position. An elevating mechanism (springs, groove portions pins) which is configured to elevate or lower the deflector plate relative to the front and rear support members is provided between the deflector lower portions and the front or rear support members.

6 Claims, 12 Drawing Sheets

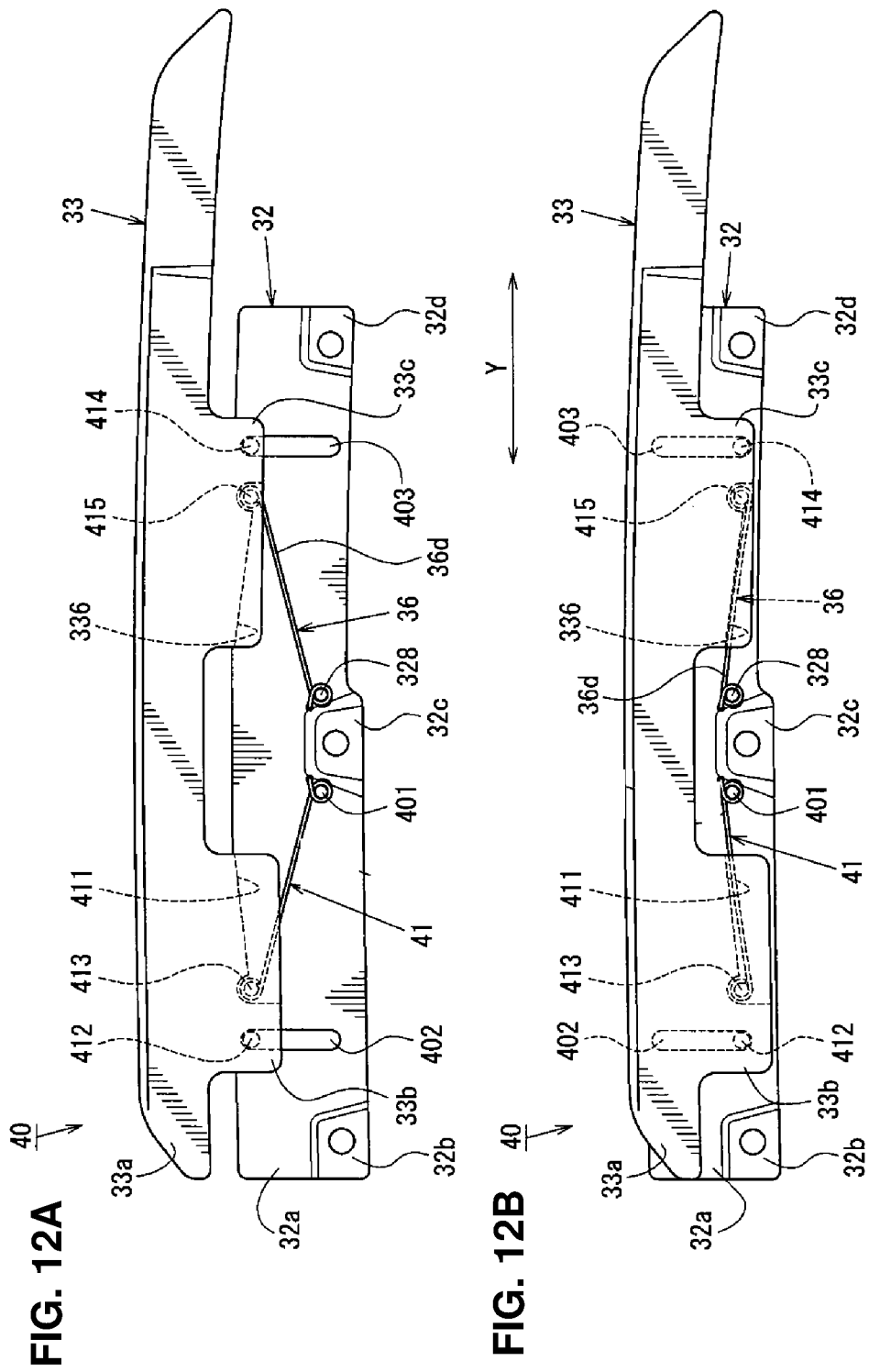

DEFLECTOR DEVICE

BACKGROUND OF THE INVENTION

The present invention relates to a deflector device which is provided at a front header positioned at an upper side of a windshield of a vehicle equipped with an openable roof.

In a so-called open car, there occur a noise caused by traveling air entrapped into a vehicle compartment (a so-called air-entrapping noise air), a noise caused by the traveling air hitting against a window frame supporting a windshield (a so-called wind noise), and the like when an openable roof is open. Accordingly, a deflector device to suppress such peculiar noises occurring when the openable roof is open has been proposed.

A device disclosed in Japanese Patent Laid-Open Publication No. 59-124432 discloses can elevate or lower an air deflector with a simple mechanism, thereby suppressing the peculiar noises occurring when the openable roof is open. However, in a case in which the deflector is supported by a link member and a biasing spring like the device disclosed in the above-described patent document, there is a concern that the support rigidity, in a vehicle longitudinal direction, of the deflector may be not sufficient.

SUMMARY OF THE INVENTION

The present invention has been devised in view of the above-described matter, and an object of the present invention is to provide a deflector device which can properly increase the support rigidity, in the vehicle longitudinal direction, of the deflector.

The present invention is a deflector device which is provided at a front header positioned at an upper side of a windshield of a vehicle equipped with an openable roof, the deflector device comprising a deflector plate configured to project upward above the front header when the roof is open, a front support member fixed to the front header and provided to support the deflector plate, contacting a front face of the deflector plate, a rear support member provided to support the deflector plate, contacting a rear face of the deflector plate, and an elevating mechanism configured to elevate or lower the deflector plate disposed between the front and rear support members relative to the front and rear support members, wherein the front and rear support members include respective joint portions where respective lower portions thereof are joined to each other, the deflector plate includes a deflector lower portion which projects downward at a position where the deflector lower portion does not interfere with the joint portions of the front and rear support members when the deflector plate is located at a lowermost position, and the elevating mechanism is provided between the deflector lower portion and the front or rear support members.

According to the present invention, the support rigidity, in the vehicle longitudinal direction, of the deflector plate can be properly increased and also a vertical length (height) of the deflector device can be properly made small. Specifically, since the deflector plate is disposed between the front support member and the rear support member, contacting these support members, the deflector plate is supported so stably by the both support members that the support rigidity, in the vehicle longitudinal direction, of the deflector plate properly increases. Further, since the deflator lower portion of the deflector plate is formed at the position where the deflector lower portion located at the lowermost position does not interfere with the joint portions for joining the both support members and also the elevating mechanism to elevate or lower the deflector plate is provided between the deflector lower portion and the front or rear support members, the vertical length (height) of the deflector device becomes properly small.

In an embodiment of the present invention, the above-described elevating mechanism comprises a spring to bias the deflector plate upward, the spring being provided between the deflector lower portion and a portion of the front or rear support members which is located in the vicinity of the joint portion to extend in a longitudinal direction of the deflector plate.

According to this embodiment, a spring base portion (i.e., an end portion of the spring which is connected to the front or rear support members) can be located at an area where the above-described downward-projecting deflector lower portion does not exist (i.e., the portion located in the vicinity of the joint portion), thereby a thickness, in the vehicle longitudinal direction, of the deflector device can be properly shortened.

Herein, it is preferable that the above-described elevating mechanism further comprise a vertically-extending groove portion provided at the front or rear support members and a pin provided at the deflector lower portion, the pin being configured to engage with the groove portion. Thereby, the thickness, in the vehicle longitudinal direction, of the deflector device can be further properly shortened.

Furthermore, it is preferable that one of both end portions of the spring which is positioned on the side of the deflector plate be configured to engage with the pin and a recess face portion which is configured to avoid interference with the spring when the deflector plate is located at the lowermost position be provided at the deflector lower portion. The above-descried shortening the longitudinal thickness of the deflector device can be further achieved.

In another embodiment of the present invention, a projection portion is provided at the front or rear support members, the projection portion being configured to adjust a gap between the front or rear support members and the deflector plate.

According to this embodiment, since the above-described projection portion slides on a front face of the rear support member or a rear face of the front support member while the deflector plate is elevated or lowered, a slide condition between the deflector plate and the front or rear support members can be properly adjusted by appropriately designing the projection portion.

Other features, aspects, and advantages of the present invention will become apparent from the following description which refers to the accompanying drawings.

BRIEF DESCRIPTION OF THE DRAWINGS

FIGS. 12A and 12B are explanatory diagrams explaining movements of a deflector device according to a second embodiment.

DETAILED DESCRIPTION OF THE INVENTION

Figure 1:
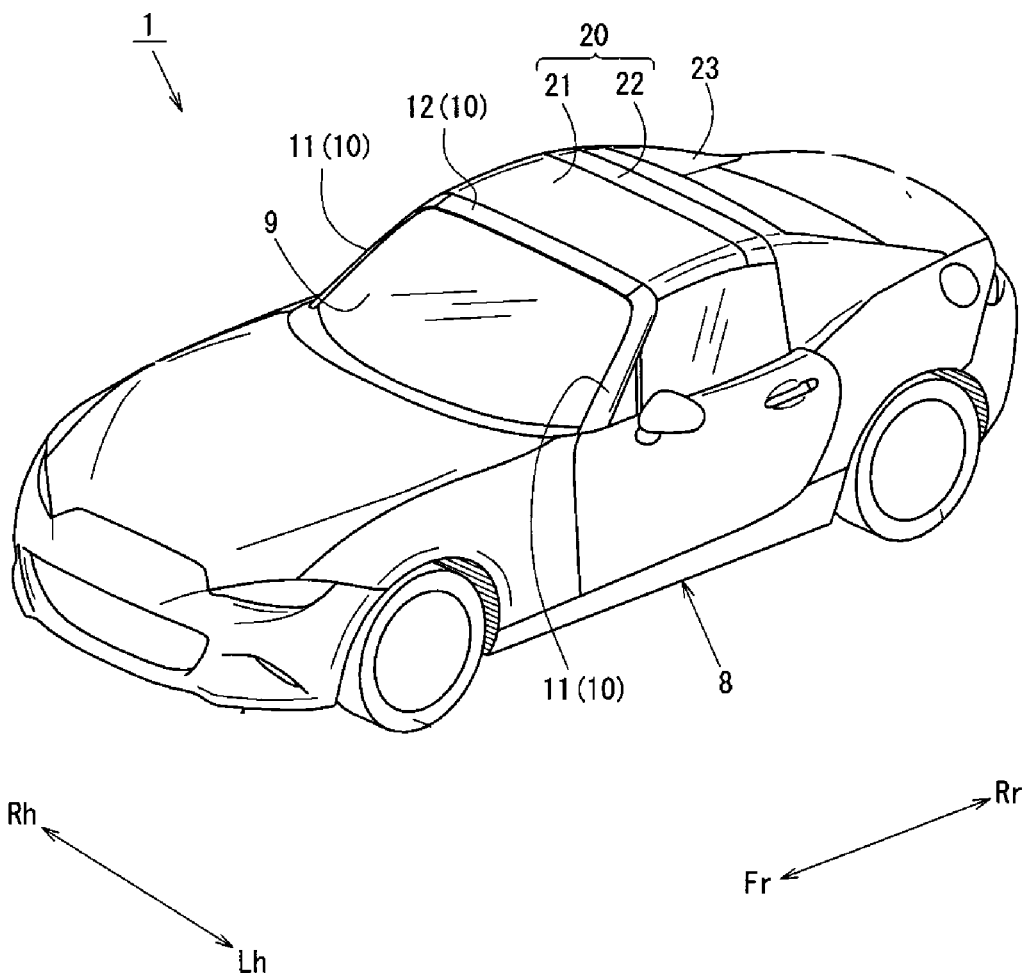
FIG. 1 is a perspective view showing an exterior of a vehicle in a state in which an openable roof is closed.
Figure 2:
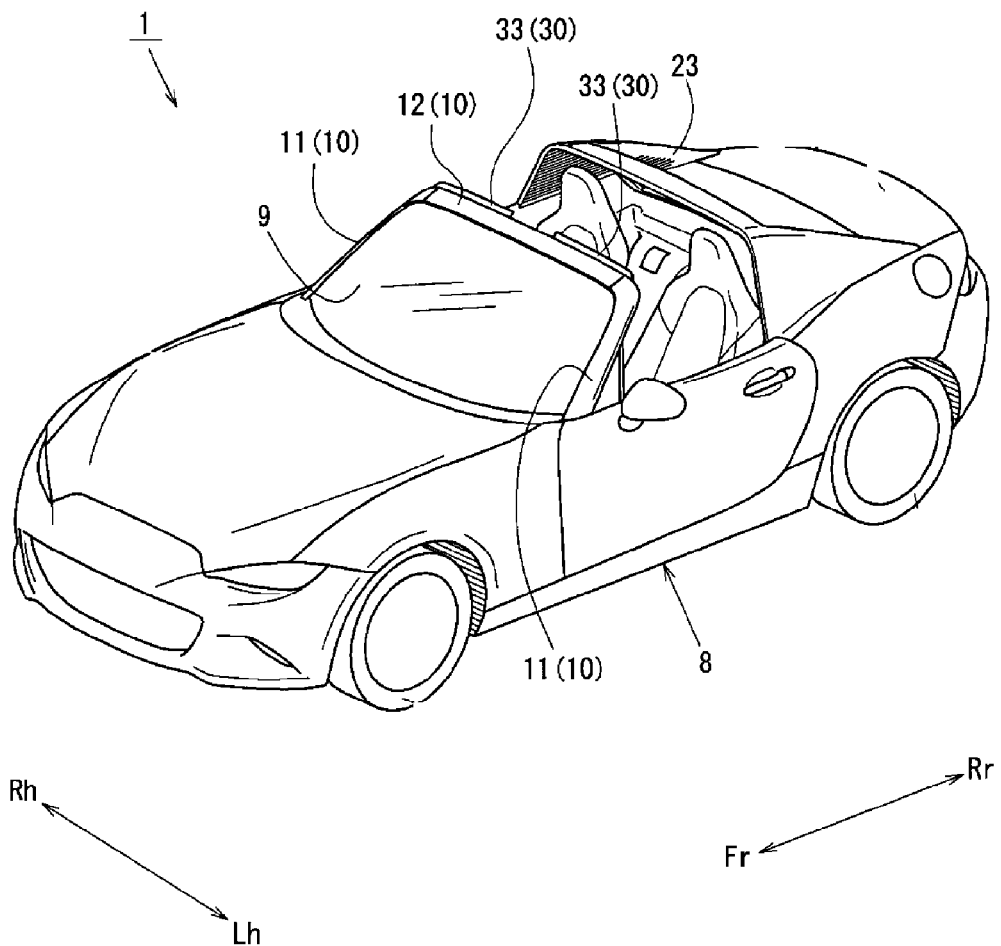
FIG. 2 is a perspective view showing the exterior of the vehicle in a state in which the openable roof is open.
Figure 3:
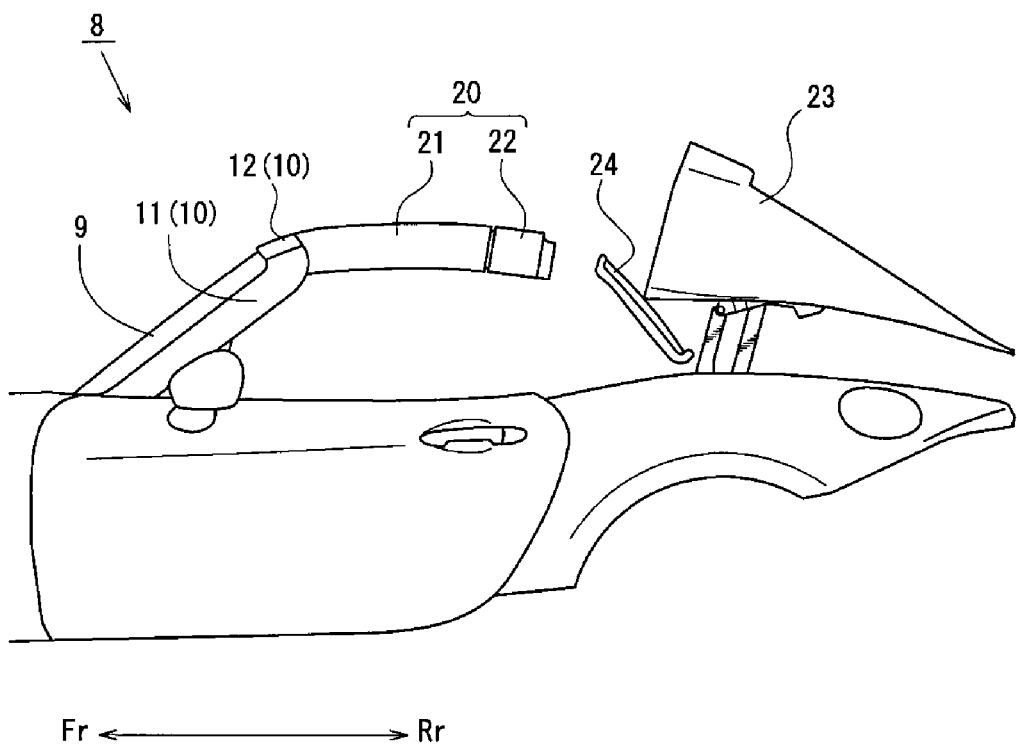
FIG. 3 is a side view showing a left-side face of the vehicle in a state in which storing of the openable roof is started.

Hereafter, embodiments of the present invention will be described referring to the accompanying drawings.

Embodiment 1

In the drawings, arrows Fr and Rr show a vehicle longitudinal direction: the arrow Fr showing a vehicle forward direction and the arrow Rr showing a vehicle rearward direction. Further, arrows Rh and Lh show a vehicle width direction: the arrow Rh showing the vehicle rightward direction and the arrow Lh showing a vehicle leftward direction. Additionally, an upper portion of the drawings shows a vehicle upper side and a lower side of the drawings shows a vehicle lower side.

An openable roof 20 of a vehicle 1 comprises a roof front portion 21 which is detachably connected to an upper portion of a window frame member 10 and a roof rear portion 22 which is positioned in back of the roof front portion 21. The openable roof 20 is storable in a storage space (not illustrated) formed below a deck cover 23 which is of a roughly gate shape in a front view and positioned in back of a vehicle compartment portion 8. In the figures, reference character 24 denotes a rear window glass.

Figure 4:
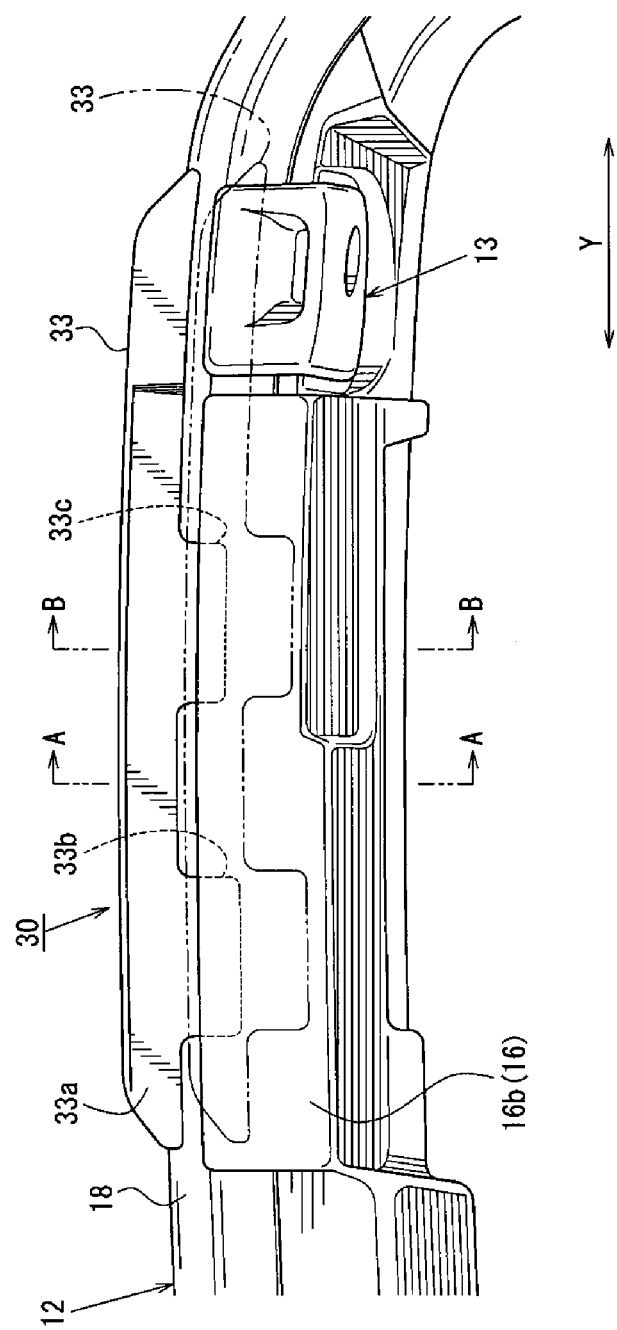
FIG. 4 is a back view showing an exterior of a deflector device in a state in which the openable roof is open, when viewed from a vehicle rearward side.

A front header 12 includes a pair of positioning pedestals 13 for the roof front portion 21 which are arranged at both side ends, in the vehicle width direction, thereof and a lock reception portion (not illustrated) which is arranged at a central portion, in the vehicle width direction, thereof as shown in FIG. 4. A pair of right-and-left defector devices 30 are arranged respectively between the lock reception portion and the pair of positioning pedestals 13.

Figure 5:
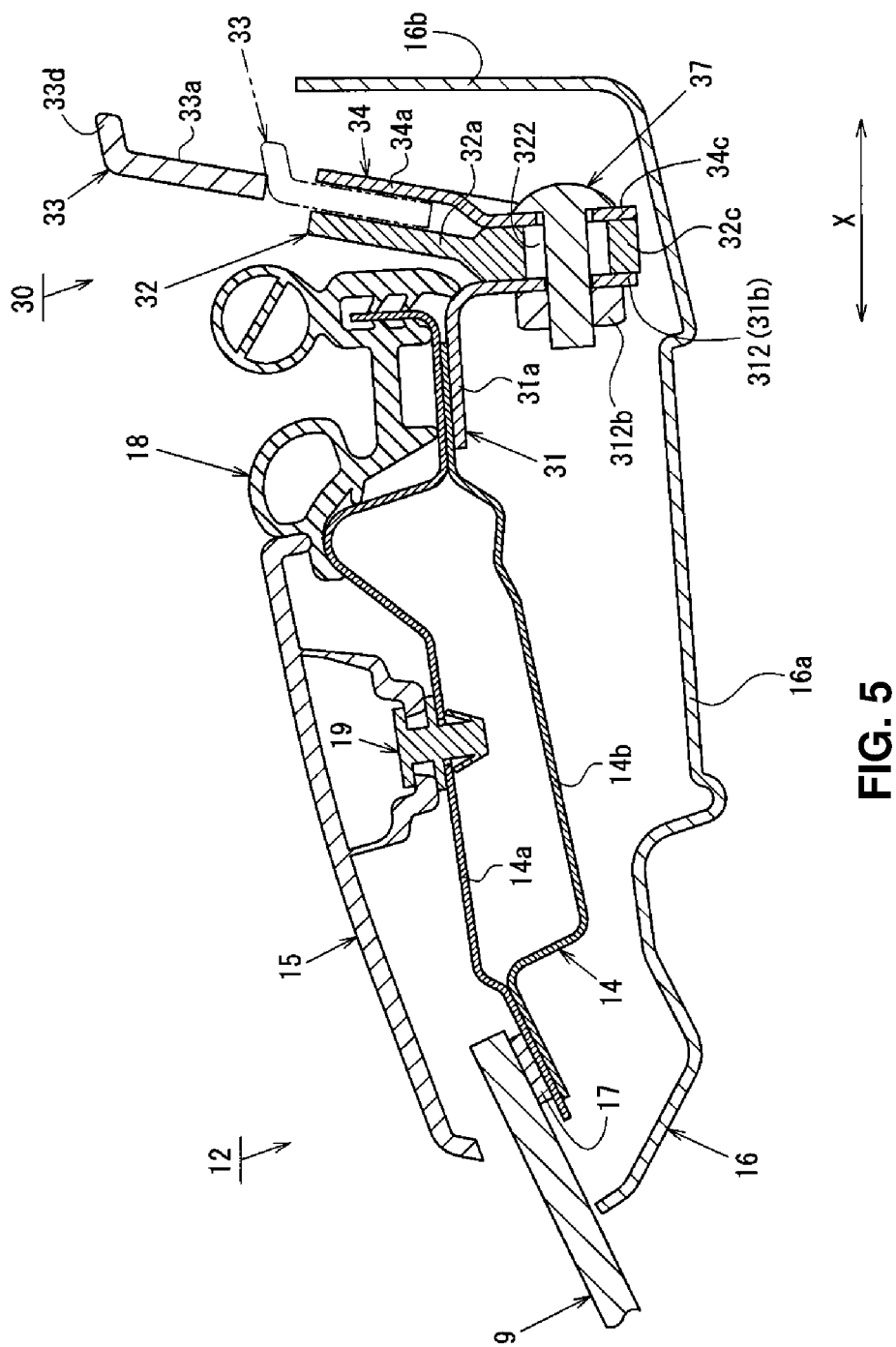
FIG. 5 is a sectional view taken along line A-A of FIG. 4.

As shown in FIG. 5, the front header 12 is joined to pillar panels of a pair of right-and-left front pillars 11, and comprises a header panel 14 which has a closed cross section extending in the vehicle width direction, a header garnish 15 which provides an exterior design face of the vehicle, and a header trim 16 which provides an interior design face of a vehicle-compartment inside.

The header panel 14 comprises, as shown in FIG. 5, a header upper panel 14a which is positioned on a vehicle upper side and a header lower panel 14b which is positioned on a vehicle lower side, which are integrally joined together, thereby having a closed cross section extending in the vehicle width direction. The header upper panel 14a extends in the vehicle width direction and has a hat-shaped cross section projecting upward. To an upper face of a front end of this header upper panel 14a is fixed an upper end of a windshield 9 via a seal member 17.

Further, a rear end of the header upper panel 14a is configured in a concave groove shape extending in the vehicle width direction by a rising portion which is formed by upward projecting a rear end of the above-described hat-shaped cross section. To the rising portion is attached a weather-strip rubber 18 which integrally closes a gap between the rising portion and a front end of the openable roof 20 and another gap between the rising portion and a rear end of the header garnish 15.

Meanwhile, the header lower panel 14b extends in the vehicle width direction and has a hat-shaped cross section projecting downward. The header garnish 15 is a synthetic resin-made exterior-design panel and detachably attached to an upper face of the header panel 14 via a resin clip 19 as shown in FIG. 5.

The header trim 16 is configured to cover a longitudinal range from the vicinity of the upper end of the windshield 9 to a position behind the deflector device 30 from below as shown in FIG. 5. More specifically, the header trim 16 comprises a bottom portion 16a which faces a lower face of the header panel 14 and the deflector device 30 and a rear wall portion 16b which extends upward from a rear end of the bottom portion 16a, which are formed integrally. The rear wall portion 16b extends in a vehicle vertical direction such that its upper end is located at a lower level than an upper end of the weather-strip rubber 18 and at an upper level than an upper end of the rear support member 34 of the deflector device 30 specifically described below.

The deflector device 30 is configured such that the deflector plate 33 is elevated to its deployment (expansion) position illustrated by solid lines in FIGS. 4 and 5 where an upper end of the deflector plate 33 is positioned above the upper end of the weather-strip rubber 18 when the openable roof 20 is open, whereas the deflector plate 33 is lowered to its storage position illustrated by two-dotted broken lines in FIGS. 4 and 5 where the upper end of the deflector plate 33 is positioned below the upper end of the weather-strip rubber 18 when the openable roof 20 is closed.

Figure 6:
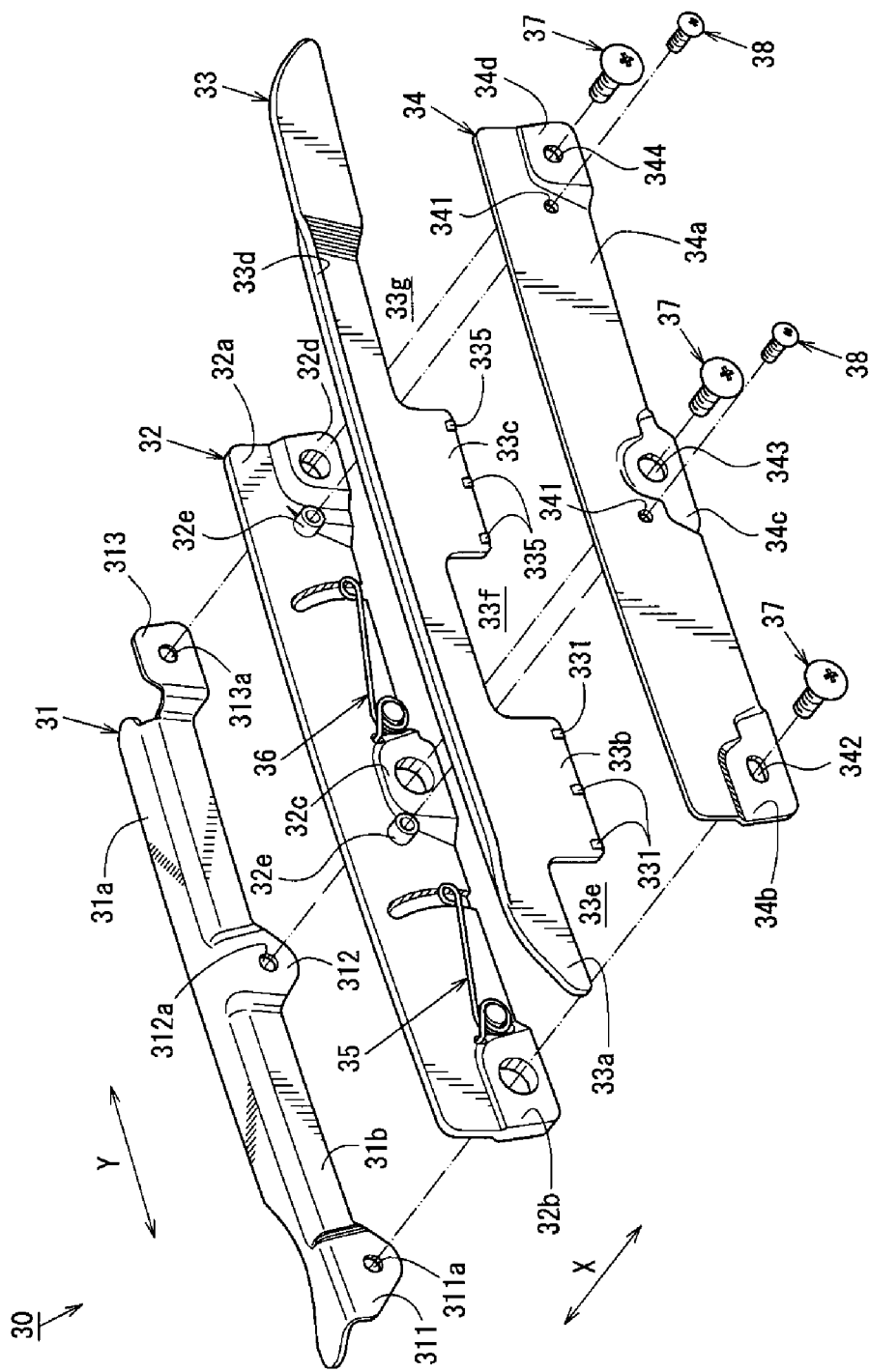
FIG. 6 is an exploded perspective view showing an exploded state of the deflector device at a storage position.

A deflector bracket 31 includes a roughly flat-shaped welded portion 31a which is welded to a lower face of a rear end of the header lower panel 14b and a vertical portion 31b which vertically extends downward form a rear end of the welded portion 31a, which are formed integrally so as to have a roughly L-shaped cross section. As shown in FIG. 6, the vertical portion 31a includes a first attachment portion 311, a second attachment portion 312, and a third attachment portion 313 which contact the front support member 32, respectively. The first attachment portion 311 has a roughly circular-shaped first insertion hole 311a for inserting a fixing screw 37 which has its hole center extending in the vehicle longitudinal direction. Further, a welded nut (not illustrated) with which the fixing screw 27 engages is fixedly welded to a front face of the first attachment portion 311. The second and third attachment portions 312, 313 are similar to the first attachment portion 311.

The front support member 32 is, as shown in FIGS. 5 and 6, made from synthetic resin and configured to have a specified vertical length such that its upper end is positioned below the upper end of the weather-strip rubber 18 and also below an upper end of the rear wall portion 16b. The front support member 32 comprises a flat plate portion 32a having a specified thickness in the vehicle longitudinal direction and first, second and third protrusion portions 32b, 32c, 32d which contact the defector bracket 31 in the vehicle longitudinal direction, respectively, which are formed integrally. The first protrusion portion 32b has a first front insertion hole 321 for inserting the fixing screw 37. The second and third protrusion portions 32c, 32d are similar to the first protrusion portion 32b.

Figure 7:
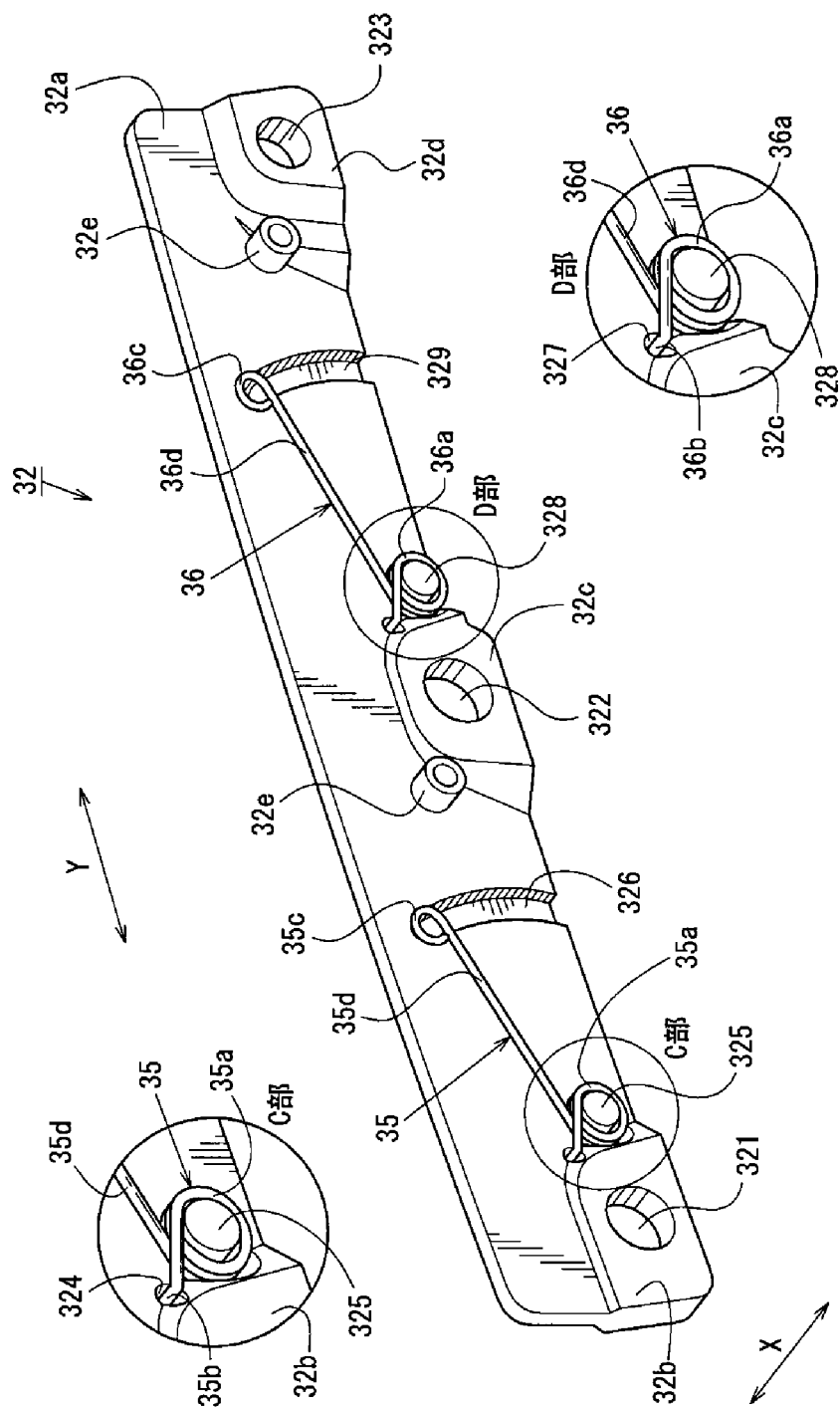
FIG. 7 is a perspective view showing an exterior of a front support member, when viewed from the vehicle rearward side.
Figure 8:
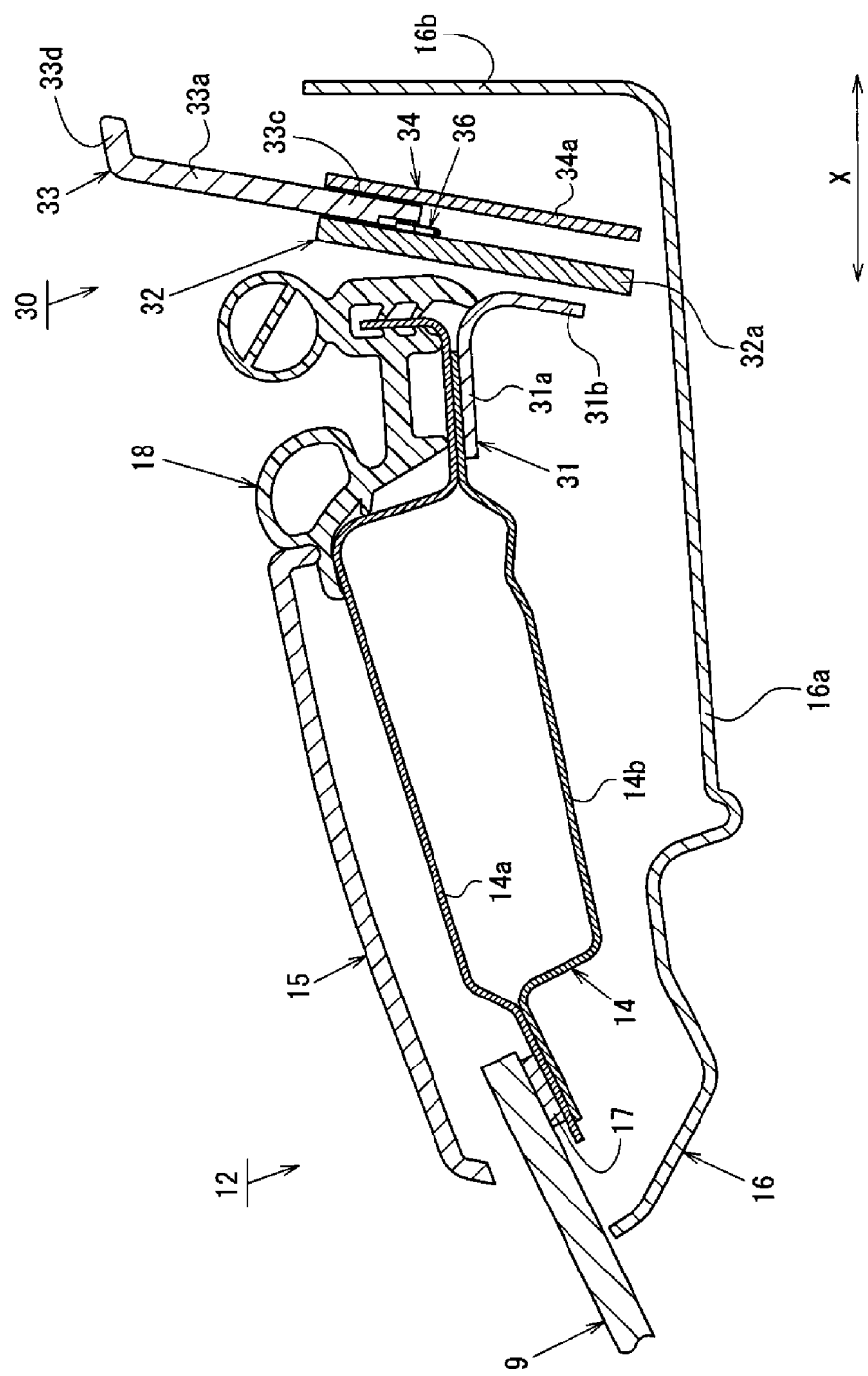
FIG. 8 is a sectional view taken along line B-B of FIG. 4 showing the deflector device at a deployment (expansion) position.

Two boss portions 32e which extend rearward are formed at a rear face of the flat plate portion 32a of the front support member 32 at respective positions located inward, in the vehicle width direction, from the second protrusion portion 32c and the third protrusion portion 32d as shown in FIGS. 6 and 7. These two boss portions 32e are configured to accept respective fastening screws 38 to be inserted through respective screw insertion holes 341 of the rear support member 34 which will be described below.

Further, at the rear face of the flat plate portion 32a are, as shown in FIG. 7, provided an inward engagement hole 324 with which one end of an inward torsion spring 35 engages, an inward spring-shaft portion 325 which pivotally supports the inward torsion spring 35, and an inward guide-groove portion 326 where an inward guide pin 333 of the deflector plate 33, which will be described below, is configured to move freely (slide).

The inward engagement hole 324 is positioned close to and on an outward side, in the vehicle width direction, of the first protrusion portion 32b and has a size which is large enough to accept the above-described one end of the inward torsion spring 35 therein. The inward spring-shaft portion 325 is of a roughly-columnar shape and configured to project rearward at a position located slightly outward, in the vehicle width direction, from the inward engagement hole 324.

The inward guide-groove portion 326 is positioned on the outward side, in the vehicle width direction, with a specified distance from the inward spring-shaft portion 325 and formed in a recessed groove shape which has an arc shape, in a back view, having its center positioned at the inward spring-shaft portion 325. This inward guide-groove portion 326 is positioned such that its upper end and the inward guide pin 333 of the deflector plate 33 contact each other in the vehicle vertical direction when the deflector plate 33 is located at its deployment position (see FIGS. 10A and 10B).

An outward engagement hole 327, an outward spring-shaft portion 328, an outward guide-groove portion 329 are configured similarly to the above-described elements 324, 325, 326.

The deflector plate 33 is made from synthetic resin and a length, in the vehicle width direction of that is configured to be longer than that of the front support member 32. A deflector upper portion 33a of the deflector plate 33 has an edge portion 33d formed integrally thereat which is configured to contact a front end of the opening roof 20 when the openable roof 20 is closed. The deflector plate 33 includes an inward deflector lower portion 33b which has cutout portions provided on its both sides, that is—a first cutout portion 33e which is located at a position facing a rectangular area, in the back view, including the first protrusion portion 32b, the inward engagement hole 324 and the inward spring-shaft portion 325 of the front support member 32 and a second cutout portion 33f which is located at a position facing another rectangular area, in the back view, including the second protrusion portion 32c, the outward engagement hole 327, the outward spring-shaft portion 328, the boss portion 32e of the front support member 32 (see FIG. 6).

As shown in FIG. 6, three rear-face projection portions 331 which are of a rectangular shape, in a front view, and project rearward are provided at a lower end of a back face of the inward deflector lower portion 33b, having a specified distance between the respective adjacent portions 331 in the vehicle width direction. The rear-face projection portions 331 are configured to slide on a front face of the rear support member 34, respectively, when the deflector plate 33 moves between the deployment position and the storage position.

Figure 10:
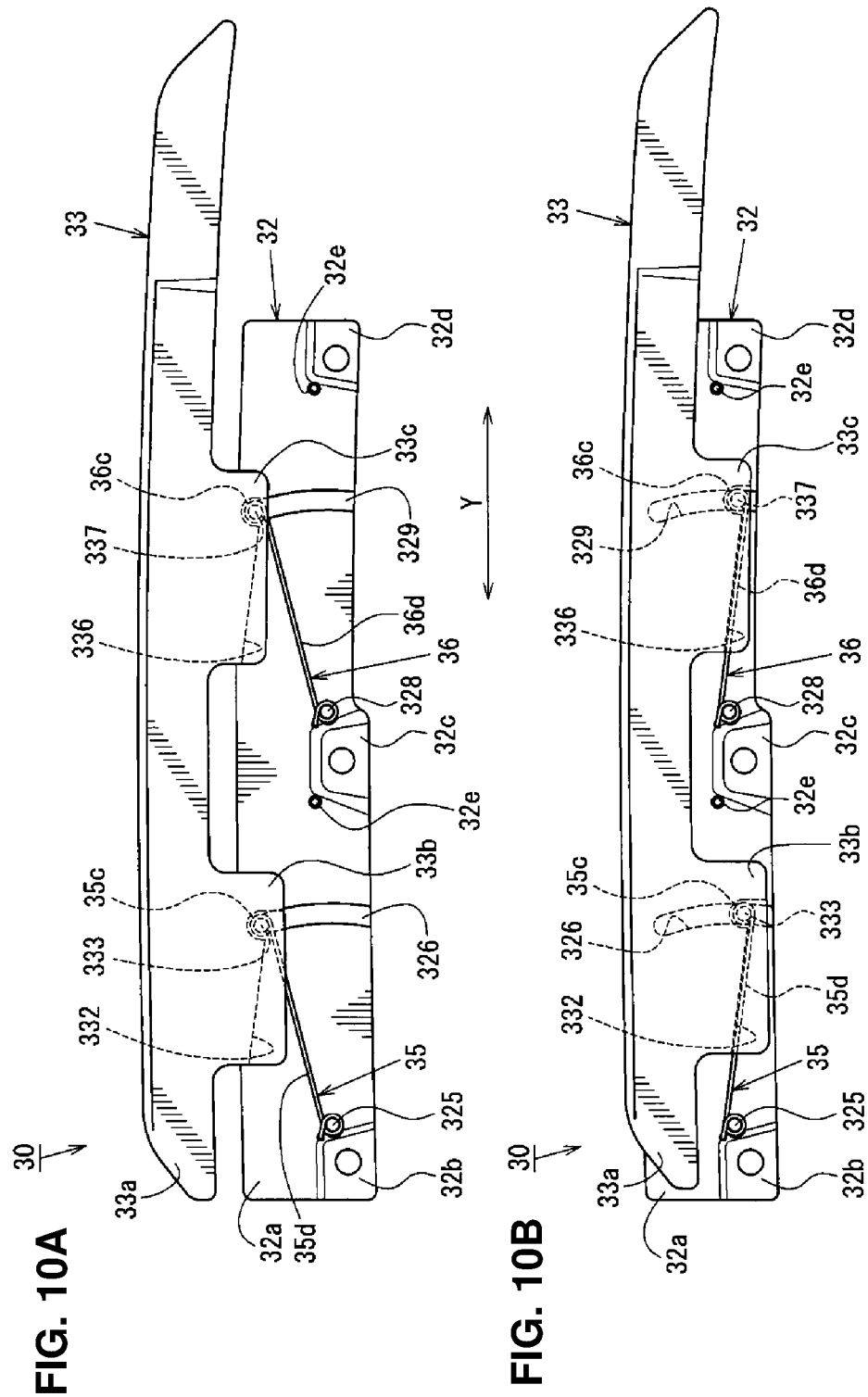
FIGS. 10A and 10B are explanatory diagrams explaining movements of the deflector device.
Figure 11:
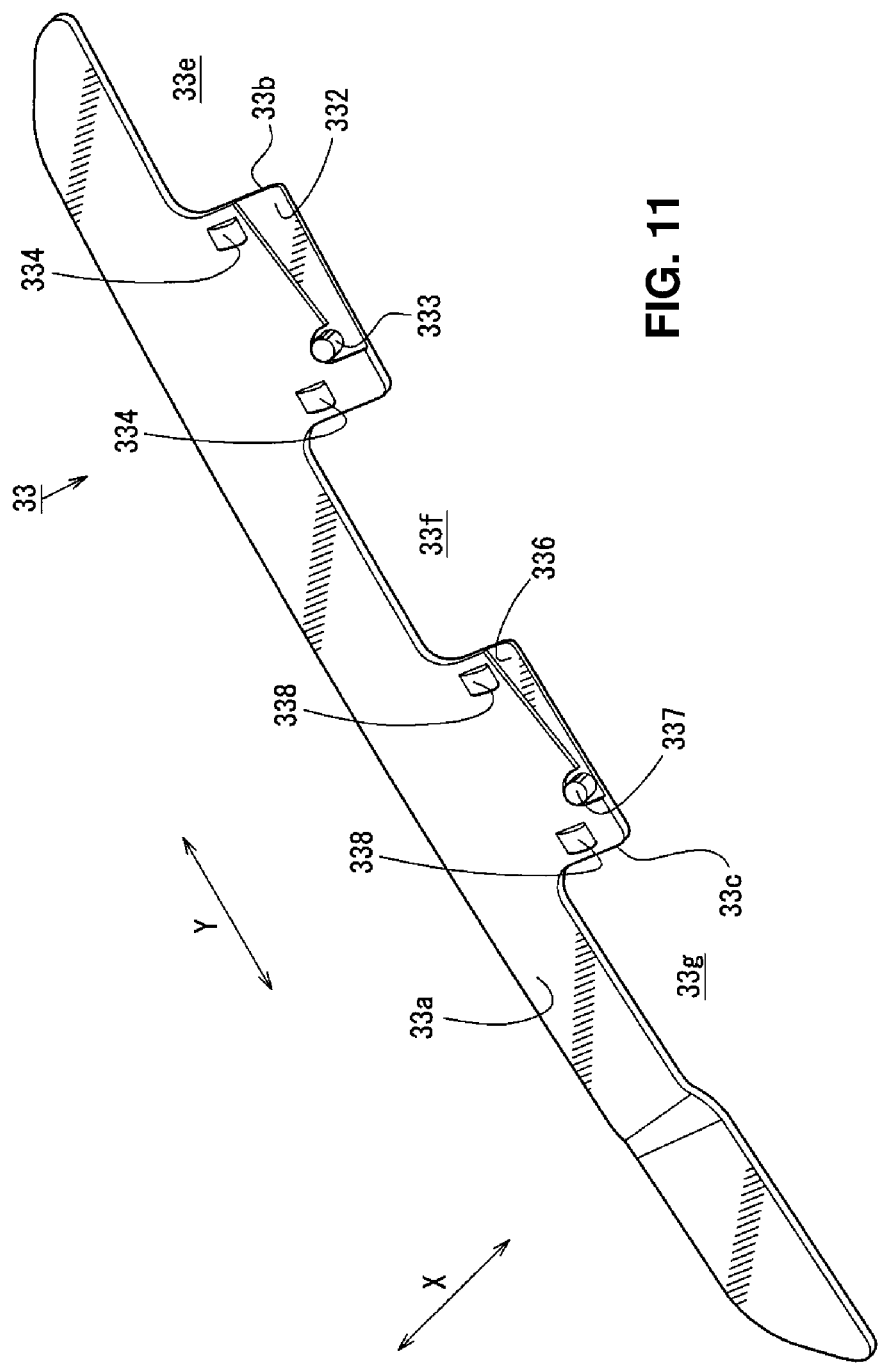
FIG. 11 is a perspective view showing an exterior of a deflector plate, when viewed from a vehicle forward side.

Further, at a front face of the inward deflector lower portion 33b are provided as shown in FIGS. 10 and 11 a recess face portion 332 which is configured to be recessed rearward and an inward guide pin 333 which is configured to engage with (to move (slide) freely in) the inward guide-groove portion 326 of the front support member 32.

The recess face portion 332 is formed by configuring such that a fan-shaped area where a straight portion 35d of the inward torsion spring 35, which will be described later, moves when the deflector plate 33 moves between the deployment position and the storage position and another area facing the inward guide-groove portion 326 when the deflector plate 33 is at the deployment position are recessed having a longitudinal depth equivalent to a diameter of the inward torsion spring 35. The inward guide pin 333 is of a roughly columnar-shaped member which projects forward from the recess face portion 332 at a specified position where it can contact an upper end of the inward guide-groove portion 326 when the deflector plate 33 is located at the deployment position.

The outward deflector lower portion 33c has a similar structure to the above-described inward deflector lower portion 33b.

The rear support member 34 is made from metal having a high rigidity and configured to have substantially the same length as that of the deflector bracket 31. Further, the rear support member 34 is configured to have a specified vertical length such that its upper end is positioned below the upper end of the weather-strip rubber 18 and also below an upper end of the rear wall portion 16b of the header trim 16 in a state in which the rear support member 34 is attached to the deflector bracket 31 as shown in FIG. 5.

The rear support member 34 comprises, as shown in FIG. 6, a roughly-flat plate-shaped portion 34a having a specified thickness in the vehicle longitudinal direction and first, second and third contact portions 34b, 34c, 34d which contact the front support member 32 in the vehicle longitudinal direction, respectively, which are formed integrally. The flat plate portion 34a has two screw insertion holes 341 for inserting the fastening screws 38 at respective positions facing the two boss portions 32e of the front support member 32 in the vehicle longitudinal direction.

The first contact portion 34b is configured such that a portion near an inward side, in the vehicle width direction, of the lower portion of the rear support member 34 is convex forward so as to contact the first protrusion portion 32b of the front support member 32. This first contact portion 34b has a first rear insertion hole 342 for inserting the fixing screw 37 which has its hole center extending in the vehicle longitudinal direction. The first rear insertion hole 342 is of an oval shape having a long axis extending in the vehicle width direction, and its short axis is almost equal to the diameter of the first bracket insertion hole 311a of the deflector bracket 31. The second and third contact potions 34c, 34d have a similar structure to the first contact portion 34a, respectively.

Further, the inward torsion spring 35 comprises a winding portion 35a which is made by winding a metal-made wire and has an inner diameter which is slightly larger than an outer diameter of the inward spring-shaft portion 325, an engagement end portion 35b which forms one end thereof which extends inward from the winding portion 35a, and a ring-shaped tip portion 35c which forms the other end thereof which extends outward from the winding portion 35a, which are formed integrally.

The engagement end portion 35b is configured to extend inward from one end of the winding portion 35a and then bend forward, and finally engage with the inward engagement hole 324 of the front support member 32. The ring-shaped tip portion 35c is formed by winding once a tip portion of the straight portion 35d which extends obliquely outward and upward from the other end of the winding portion 35a so as to have its diameter which is large enough to insert the inward guide pin 333 of the deflector plate 33 therein.

Herein, the straight portion 35d has a specified length such that the ring-shaped tip portion 35c faces an upper end of the above-described inward guide groove portion 326 when being attached to the inward spring-shaft portion 325. The inward spring-shaft portion 325 constitutes an elevating mechanism to elevate or lower the deflector plate 33 together with the inward spring-shaft portion 325 and the inward engagement hole 324 of the front support member 32.

An outward torsion spring 36 is formed in the same shape as the inward torsion spring 35.

Hereafter, steps of making (assembling) the deflector device 30 will be described.

First, the engagement end portion 35b of the inward torsion spring 35 is inserted into the inward engagement hole 324 of the front support member 32, and the winding portion 35a of the inward torsion spring 35 is attached to the inward spring-shaft portion 325.

Likewise, the outward torsion spring 36 is attached to the front support member 32. Herein, the ring-shaped tip portion 35c of the inward torsion spring 35 faces the upper portion of the inward guide-groove portion 326, and the ring-shaped tip portion 36c of the outward torsion spring 36 faces the upper portion of the outward guide-groove portion 329. After the inward torsion spring 35 and the outward torsion spring 36 are attached to the front support member 32, the deflector plate 33 is attached to the front support member 32.

Herein, the deflector plate 33 is attached to the front support member 32 such that the inward guide pin 333 of the deflector plate 33 engages with (moves freely in) the inward guide-groove portion 326 of the front support member 32 via the ring-shaped tip portion 35c of the inward torsion spring 35, and the outward guide pin 337 of the deflector plate 33 engages with (moves freely in) the outward guide-groove portion 329 via the ring-shaped tip portion 36c of the outward torsion spring 36.

Subsequently, the front support member 32 and the rear support member 34 are overlapped having the deflector plate 33 disposed therebetween, and the fastening screws 38 are inserted into the boss portion 32e through the screw insertion holes 341, thereby fastening the front support member 32 and the rear support member 34 together. Then, the front support member 32 and the rear support member 34 with the deflector plate 33 disposed therebetween are attached to the deflector bracket 31 previously welded to the header panel 14.

Herein, the fixing screws 37 are screwed into the deflector bracket 31 through the first, second and third rear insertion holes 342, 343, 344 of the rear support member 34 and the first, second and third front insertion holes 321, 322, 323 of the front support member 32, thereby fixedly attached to the deflector bracket 31.

By the above-described attachment to the header panel 14, the deflector device 30 becomes a state in which the inward guide pin 333 and the inward guide-groove portion 326 contact each other and also the outward guide pin 337 and the outward guide-groove portion 329 are made to contact each other due to upward biasing forces of the inward and outward torsion springs 35, 36.

Accordingly, the deflector plate 33 takes the deployment position and becomes a state in which the inward deflector lower portion 33b and the outward deflector lower portion 33c overlap with the flat plate portion 32a of the front support member 32 and the flat plate portion 34a of the rear support member 34 in the vehicle longitudinal direction.

Next, a move of the deflector device 30 in which the deflector plate 33 changes its position from the deployment position to the storage position will be described referring to FIGS. 10A and 10B. First, as shown in FIG. 10A, when the openable roof 20 is closed in a state in which the openable roof 20 is open, that is—the deflector plate 33 takes the deployment position, the deflector plate 33 is pushed down by a front end of the openable roof 20 moving downward.

Accordingly, the deflector plate 33 starts its downward moving against the biasing forces of the inward torsion spring 35 and the outward torsion spring 36. Herein, the deflector plate 33 moves outward and downward roughly in parallel to the storage position along the inward guide-groove portion 326 and the outward guide-groove portion 329.

When the openable roof 20 is closed completely, the deflector plate 33 completes its move to the storage position as shown in FIG. 10B. Herein, the deflector plate 33 is stored in a state in which its upward move and its downward move are regulated by the biasing forces of the inward torsion spring 35 and the outward torsion spring 36 and its contact with the front end of the openable roof 20.

Meanwhile, when the openable roof 20 is opened, the biasing forces of the inward torsion spring 35 and the outward torsion spring 36 act, so that the deflector plate 33 moves inward and upward roughly in parallel to the deployment position along the inward guide-groove portion 326 and the outward guide-groove portion 329.

Accordingly, the deflector device 30 can support the deflector plate 33 stably even in the process of elevating or lowering the deflector plate 33, compared with a case in which the deflector plate is supported only by a link member and a biasing force. Further, according to the present structure, the inward torsion spring 35 and the outward torsion spring 36 themselves move in a manner of a four-bar linkage, so that the deflector plate 33 can be supported stably without leaning in the vehicle width direction.

Embodiment 2

Next, a deflector device 40 to elevate or lower the deflector plate 33 according to a second embodiment, which is different from the above-described deflector device 30 of the first embodiment, will be described referring to FIGS. 12A and 12B. The same structures as the first embodiment are denoted by the same reference characters, detailed descriptions of which are omitted here. In FIGS. 12A and 12B, illustration of the rear support member 34 is omitted.

The deflector device 40 of the second embodiment is different from the deflector device 30 of the first embodiment in respective shapes of an inward torsion spring 41, the front support member 32, and the deflector plate 33. The inward torsion spring 41 is laterally symmetrical relative to the outward torsion spring 36 as shown in FIGS. 12A and 12B.

At a rear face of the front support member 32 are provided a first end insertion hole (not illustrated) which opens at a position located near an inward side, in the vehicle width direction, of the second protrusion portion 32c, an inward spring-shaft portion 401 which is formed at a position located slightly inward, in the vehicle width direction, from the first end insertion portion, an inward guide-groove portion 402 which is formed at a position located inward, in the vehicle width direction, from a ring-shaped tip portion (not illustrated) of the inward torsion spring 41, the second end insertion hole (not illustrated) which opens at the position located near the outward side, in the vehicle width direction, of the second protrusion portion 32c, the outward spring-shaft portion 328 which is formed at the position located slightly inward, in the vehicle width direction, from the second end insertion portion, and an outward guide-groove portion 403 which is formed at a position located inward, in the vehicle width direction, from the ring-shaped tip portion (not illustrated) of the outward torsion spring 36.

Further, at the inward deflector lower portion 33b of the deflector plate 33 are provided, as shown in FIGS. 12A and 12B, a recess face portion 411 which is configured to be recessed at an area overlapping a movable range of the inward torsion spring 41 and an inward guide pin 412 which is configured to engage with (move freely in) the inward guide-groove portion 402, which are arranged in this order from the outward side. Further, at the recess face portion 411 is provided a shaft portion 413 projecting forward, at which a ring-shaped tip portion of the inward torsion spring 41 is rotatably supported.

Meanwhile, at the outward deflector lower portion 33c are provided, as shown in FIGS. 12A and 12B, the recess face portion 336 and an outward guide pin 414 which is configured to engage with (move freely in) the outward guide-groove portion 403, which are arranged in this order from the inward side. Further, at the recess face portion 336 is provided a shaft portion 415 projecting forward, at which the ring-shaped tip portion of the outward torsion spring 36 is rotatably supported.

Herein, the joint portions of the front and rear support members 32, 34 where their respective lower portions are joined to each other in the present invention correspond to the first through third protrusion portions 32b-d of the front support member 32 and the first through third protrusion portions 34b-d of the rear support member 34 in the above-described embodiments.

Figure 9:
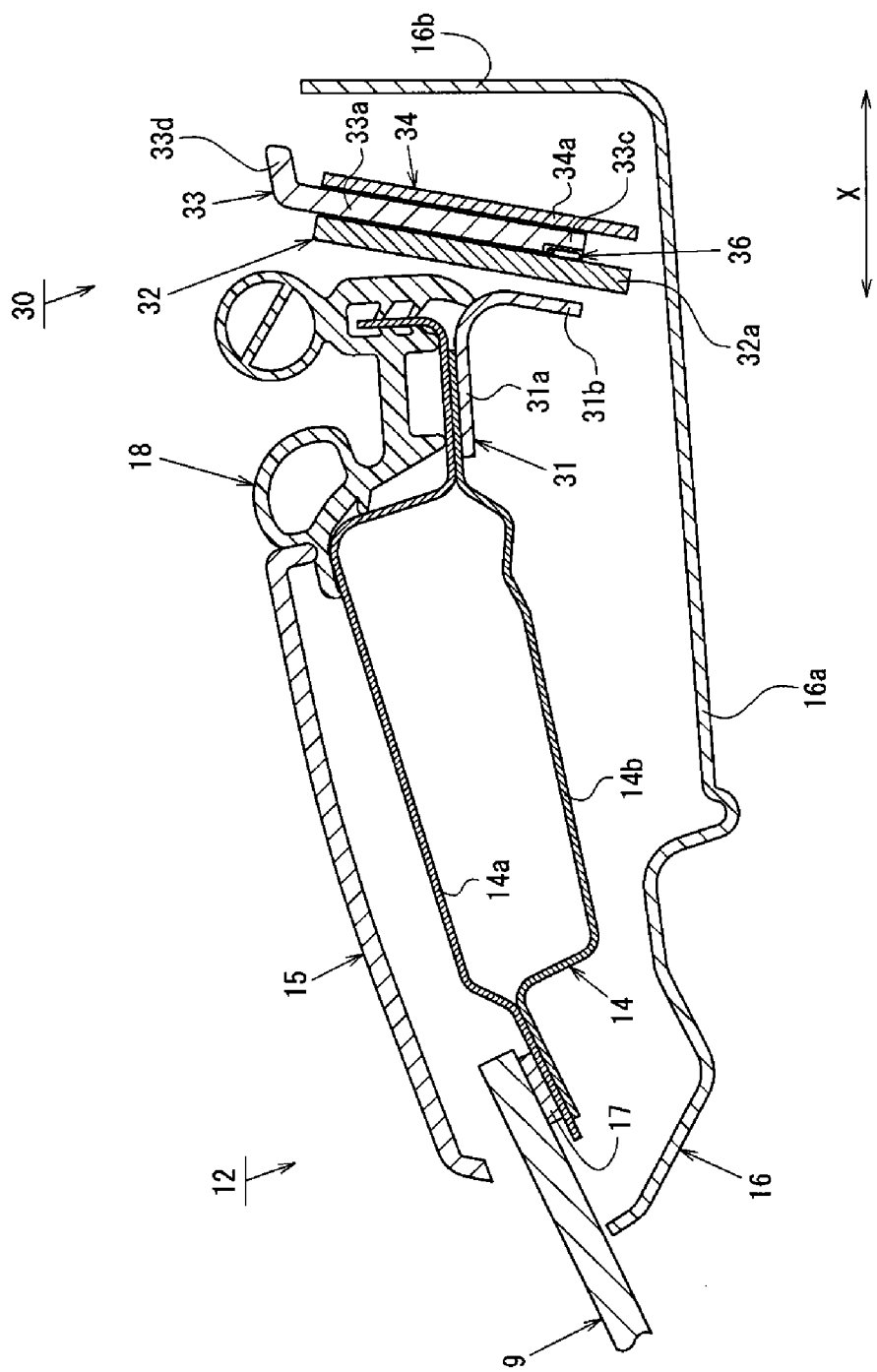
FIG. 9 is a sectional view taken along line B-B of FIG. 4 showing the deflector device at the storage position.

Further, the inward and outward deflector lower portions 33b, 33c of the deflector plate 33 are the ones which respectively project downward at the respective positions where the deflector lower portions 33b, 33c do not interfere with the above-described joint portions of the front and rear support members 32, 34 (i.e., the first through third protrusion portions 32b-d of the front support member 32, the first through third protrusion portions 34b-d of the rear support member 34) when the deflector plate 33 is located at the lowermost position (see FIG. 9).

The present invention should not be limited to the above-described embodiments, and any other modifications or improvements may be applied within the scope of a spirit of the present invention.

What is claimed is:

1. A deflector device which is provided at a front header positioned at an upper side of a windshield of a vehicle equipped with an openable roof, the deflector device comprising:
   a deflector plate configured to project upward above the front header when the roof is open and extend in a vehicle width direction;
   a front support member fixed to the front header and provided to support the deflector plate, contacting a front face of the deflector plate;
   a rear support member provided to support the deflector plate, contacting a rear face of the deflector plate; and
   an elevating mechanism configured to elevate or lower the deflector plate disposed between the front and rear support members relative to the front and rear support members,
   wherein said front and rear support members include respective joint portions where respective lower portions thereof are joined to each other, a lower edge of said deflector plate comprises a projection portion which is configured to be convex downward and a cutout portion which is configured to be concave upward, said cutout portion is located at a position, in the vehicle width direction, of the deflector plate which matches said joint portions of the front and rear support members so that said projection portion of the deflector plate does not interfere with the joint portions of the front and rear support members when the deflector plate is located at a lowermost position, and said elevating mechanism is provided between said projection portion of the deflector plate and said front or rear support members.

2. The deflector device of claim 1, wherein said elevating mechanism comprises a spring to bias said deflector plate upward, the spring being provided between said deflector lower portion and a portion of said front or rear support members which is located in the vicinity of said joint portion to extend in a longitudinal direction of said deflector plate.

3. The deflector device of claim 2, wherein said elevating mechanism further comprises a vertically-extending groove portion provided at said front or rear support members and a pin provided at said deflector lower portion, the pin being configured to engage with said groove portion.

4. The deflector device of claim 1, wherein a projection portion is provided at said front or rear support members, the projection portion being configured to adjust a gap between the front or rear support members and said deflector plate.

5. The deflector device of claim 3, wherein one of both end portions of said spring which is positioned on the side of said deflector plate is configured to engage with said pin.

6. The deflector device of claim 5, wherein a recess face portion which is configured to avoid interference with said spring when said deflector plate is located at the lowermost position is provided at said deflector lower portion.

* * * * *